United States Patent
Wang

(10) Patent No.: US 8,695,635 B1
(45) Date of Patent: Apr. 15, 2014

(54) MIXING VALVE DEVICE SWITCHABLE TO DIFFERENT OUTLET

(71) Applicant: Hsiang Hung Wang, Taichung (TW)

(72) Inventor: Hsiang Hung Wang, Taichung (TW)

( * ) Notice: Subject to any disclaimer, the term of this patent is extended or adjusted under 35 U.S.C. 154(b) by 28 days.

(21) Appl. No.: 13/660,063

(22) Filed: Oct. 25, 2012

(51) Int. Cl.
*F16K 11/078* (2006.01)
*F16K 11/074* (2006.01)
*F16K 5/14* (2006.01)

(52) U.S. Cl.
USPC ............. 137/625.17; 137/597; 137/625.42; 251/317

(58) Field of Classification Search
CPC ............ F16K 11/0787; F16K 11/0743; F16K 27/045; F16K 31/605; F16K 19/006; E03C 2201/30
USPC ............ 137/625.17, 597, 801, 454.6, 625.42, 137/625.46, 625.15; 251/317, 208; 4/677
See application file for complete search history.

(56) References Cited

U.S. PATENT DOCUMENTS

| | | | |
|---|---|---|---|
| 4,653,538 A * | 3/1987 | Tsutsui et al. | 137/625.46 |
| 5,749,393 A | 5/1998 | Yang | |
| 5,839,471 A | 11/1998 | Yang | |
| 5,896,601 A | 4/1999 | Humpert et al. | |
| 6,029,687 A * | 2/2000 | Chang | 137/98 |
| 6,123,105 A | 9/2000 | Yang | |
| 6,237,622 B1 * | 5/2001 | Cook et al. | 137/270 |
| 6,634,380 B2 * | 10/2003 | Bartkus et al. | 137/625.46 |
| 6,892,761 B2 * | 5/2005 | Chen | 137/625.4 |
| 6,959,731 B2 * | 11/2005 | Bartkus et al. | 137/625.46 |
| 7,014,166 B1 | 3/2006 | Wang | |
| 7,389,793 B2 | 6/2008 | Wang | |
| 8,327,882 B2 * | 12/2012 | Li et al. | 137/625.4 |
| 2007/0044850 A1 * | 3/2007 | Pieters | 137/597 |

* cited by examiner

*Primary Examiner* — Craig Schneider
*Assistant Examiner* — Atif Chaudry
(74) *Attorney, Agent, or Firm* — Charles E. Baxley

(57) ABSTRACT

A mixing valve device includes a stationary valve piece attached to a cover of an outer housing and having two inlet passages for receiving cold water and hot water and having two outlet passages, a movable valve piece movably and rotatably engaged in the housing and having an outlet pathway for selectively aligning with either of the outlet passages of the stationary valve piece and for controlling the mixed water to flow out through either of the outlet passages of the stationary valve piece, the movable valve piece includes an inlet pathway adjustable to different communication area with the inlet passages of the stationary valve piece for adjusting the water temperature of the mixed water.

6 Claims, 6 Drawing Sheets

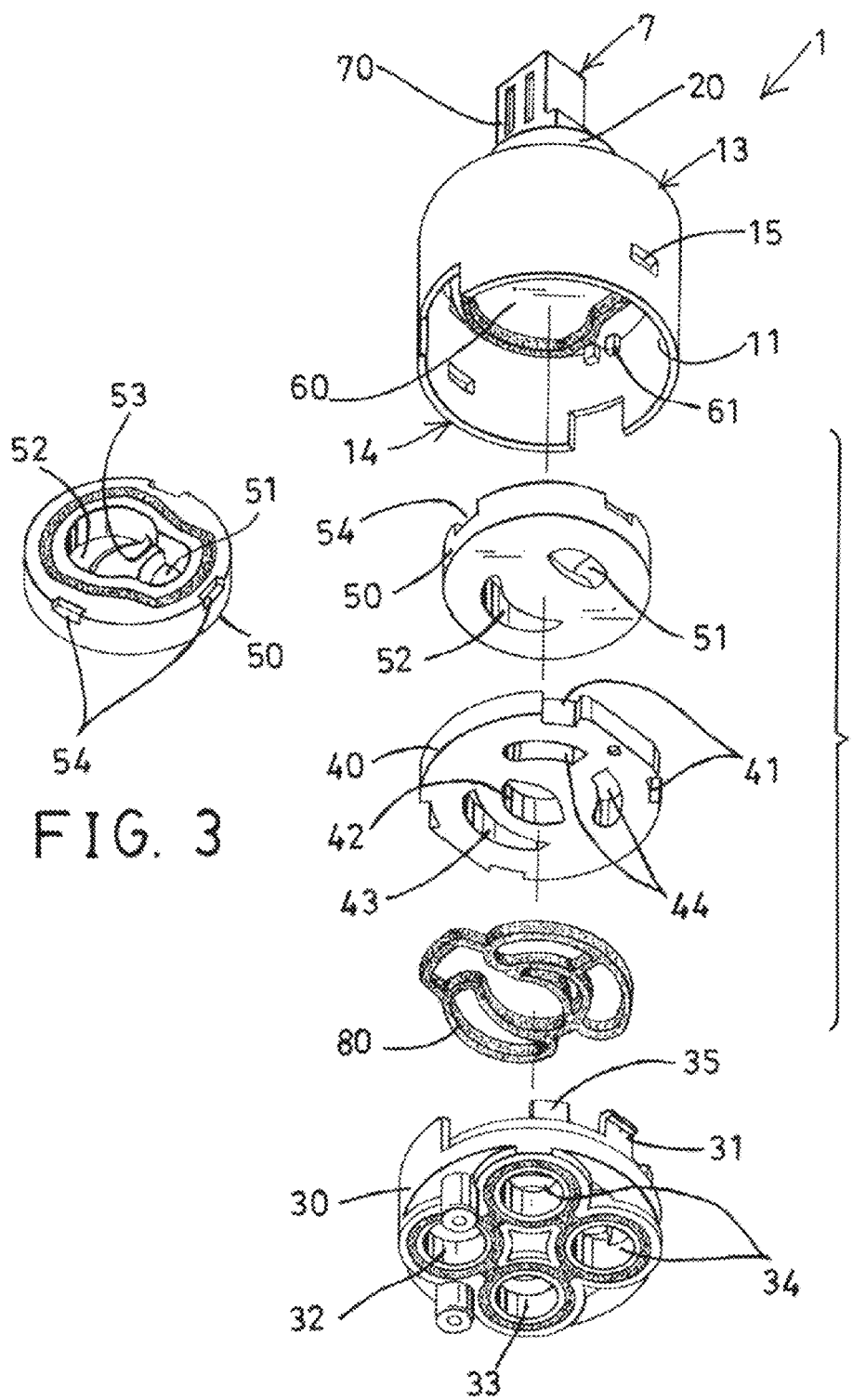

MIXING VALVE DEVICE SWITCHABLE TO DIFFERENT OUTLET

The present invention is a continuation-in-part of U.S. patent application Ser. No. 12/803,719, filed 2 Jul. 2010, pending and to be abandoned.

BACKGROUND OF THE INVENTION

1. Field of the Invention

The present invention relates to a mixing valve device, and more particularly to a mixing valve device including a switchable structure for switching to different outlet ports and for selectively operatable either manually or automatically.

2. Description of the Prior Art

Various kinds of typical mixing valve devices have been developed for mixing cold and hot water and for providing a mixed water of a suitable or selected temperature and for bathing or showering purposes, and the typical mixing valve devices normally comprise a control stem rotatably attached or mounted to an outer housing for controlling the mixed water of the suitable temperature to flow out of the housing.

For example, U.S. Pat. No. 5,749,393 to Yang, U.S. Pat. No. 5,839,471 to Yang, U.S. Pat. No. 6,029,687 to Chang, and U.S. Pat. No. 6,123,105 to Yang disclose several of the typical mixing valve devices for mixing cold and hot water and each also comprising a control stem rotatably attached or mounted to an outer housing for engaging with the valve member to control the mixed water of the suitable temperature to selectively flow out of the housing.

However, the typical mixing valve devices may only be operated manually, but may not be operated or actuated automatically.

U.S. Pat. No. 7,014,166 to Wang, and U.S. Pat. No. 7,389,793 to Wang disclose two further typical mixing valve devices for mixing cold and hot water and switchable and operatable either manually or automatically.

However, the typical mixing valve devices should all be switched off and stopped working and may not be worked when the solenoid valve or control device has become failed, and may only be used again after the typical mixing valve devices have been repaired or fixed.

U.S. Pat. No. 5,896,601 to Humpert et al. discloses a still further typical mixing valve device for mixing cold and hot water selectively.

However, the outlet passages of the valve housing or cartridge are arranged perpendicular to the cold and hot water inlets, and a greater size or dimension or volume is required for the typical mixing valve device.

The present invention has arisen to mitigate and/or obviate the afore-described disadvantages of the conventional mixing valve devices.

SUMMARY OF THE INVENTION

The primary objective of the present invention is to provide a mixing valve device including a switchable structure for switching to different outlet ports and for selectively operatable either manually or automatically and for allowing the mixing valve device to be used or worked manually even when the solenoid valve or control device has become failed.

In accordance with one aspect of the invention, there is provided a mixing valve device comprising a housing including a chamber formed therein, and including an opening formed in an upper portion thereof and including a bottom portion, a cover attached to the bottom portion of the housing and including two inlet ports separated from each other for receiving cold water and hot water respectively, and including a first outlet port and a second outlet port formed therein, the cover including a conduit member formed therein and defined by two first peripheral conduit segments and a second peripheral conduit segment and a third peripheral conduit segment, a stationary valve piece disposed in the chamber of the housing and attached to the cover, and including two inlet passages formed therein and communicating with the inlet ports of the cover for receiving the cold water and the hot water from the inlet ports of the cover respectively, and including a first outlet passage and a second outlet passage formed therein and communicating with the first and the second outlet ports of the cover respectively, a sealing member engaged with the conduit member of the cover and engaged with the stationary valve piece for making a water tight seal between the stationary valve piece and the cover, the cover including two first peripheral ribs for forming the first peripheral conduit segments and for forming two orifices in the cover which are communicating with the inlet ports of the cover for guiding the cold water and the hot water from the inlet ports of the cover to the inlet passages of the stationary valve piece respectively, the cover including a second peripheral rib and a third peripheral rib for forming the second and the third peripheral conduit segments and for forming a space and an aperture in the cover which are communicating with the first and the second outlet ports of the cover respectively and for guiding the mixed water to flow from the first and the second outlet passages of the stationary valve piece to the first and the second outlet ports of the cover respectively, the space defined by the second peripheral rib including an oblong structure having a primary space portion offset and spaced from the first and the second outlet ports of the cover and a narrowed and curved neck portion communicating with the first outlet port of the cover for guiding the mixed water to flow from the first outlet passage of the stationary valve piece to the first outlet port of the cover, and the aperture in the cover and formed by the second peripheral rib including an oblong structure communicating with the second outlet port of the cover for guiding the mixed water to flow from the second outlet passage of the stationary valve piece to the second outlet port of the cover, a movable valve piece movably and rotatably received and engaged in the chamber of the housing and engaged with the stationary valve piece, and including an outlet pathway formed therein, and the movable valve piece being movable relative to the stationary valve piece for selectively aligning the outlet pathway of the movable valve piece with either the first outlet passage or the second outlet passage of the stationary valve piece and for controlling the mixed water to flow out through either the first or the second outlet passage of the stationary valve piece, the movable valve piece including an inlet pathway formed therein and communicating with the inlet passages of the stationary valve piece, and the movable valve piece being rotatable relative to the stationary valve piece for adjusting a communication area of the inlet pathway of the movable valve piece with the inlet passages of the stationary valve piece and for adjusting a flowing quantity of the cold water and the hot water through the inlet passages of the stationary valve piece and for adjusting a water temperature of a mixed water when the outlet pathway of the movable valve piece is communicating with either the first outlet passage or the second outlet passage of the stationary valve piece, and an actuating device coupled to the movable valve piece for moving and rotating the movable valve piece relative to the stationary valve piece to selectively aligning the outlet pathway of the movable valve piece with either the first outlet passage or the second outlet passage of the stationary valve piece and to selectively rotating the movable valve piece relative to the stationary valve piece and to adjust the communication area of the inlet pathway of the movable valve piece with the inlet passages of the stationary valve piece and to adjust the flowing quantity of the cold water and the hot water through the inlet passages of the stationary valve piece and to adjust the water temperature of the mixed water.

The actuating device includes a follower member connected to the movable valve piece for being moved and rotated in concert with the movable valve piece.

The movable valve piece includes at least one depression formed therein, and the follower member includes at least one key extended therefrom for engaging with the at least one depression of the movable valve piece and for anchoring the follower member to the movable valve piece and for allowing the follower member and the movable valve piece to be moved and rotated in concert with each other.

The actuating device includes an actuating lever connected to the follower member for moving and rotating the movable valve piece relative to the stationary valve piece.

The actuating device includes a barrel rotatably received and engaged in the opening of the housing and having a bore formed in the barrel, and the actuating lever is engaged into the bore of the barrel and pivotally coupled to the barrel with a pivot axle, and the actuating lever includes an actuating end engaged with the follower member for moving and rotating the follower member and the movable valve piece relative to the stationary valve piece.

The follower member includes a non-circular recess formed therein, and the actuating end of the actuating lever includes a non-circular cross section for engaging with the non-circular recess of the follower member and for allowing the follower member and the movable valve piece to be pivoted or rotated relative to the stationary valve piece with the actuating lever.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a partial exploded view of the mixing valve device;

FIG. 3 is an upper perspective view illustrating a movable valve piece of the mixing valve device;

DETAILED DESCRIPTION OF THE PREFERRED EMBODIMENT

Figure 1:
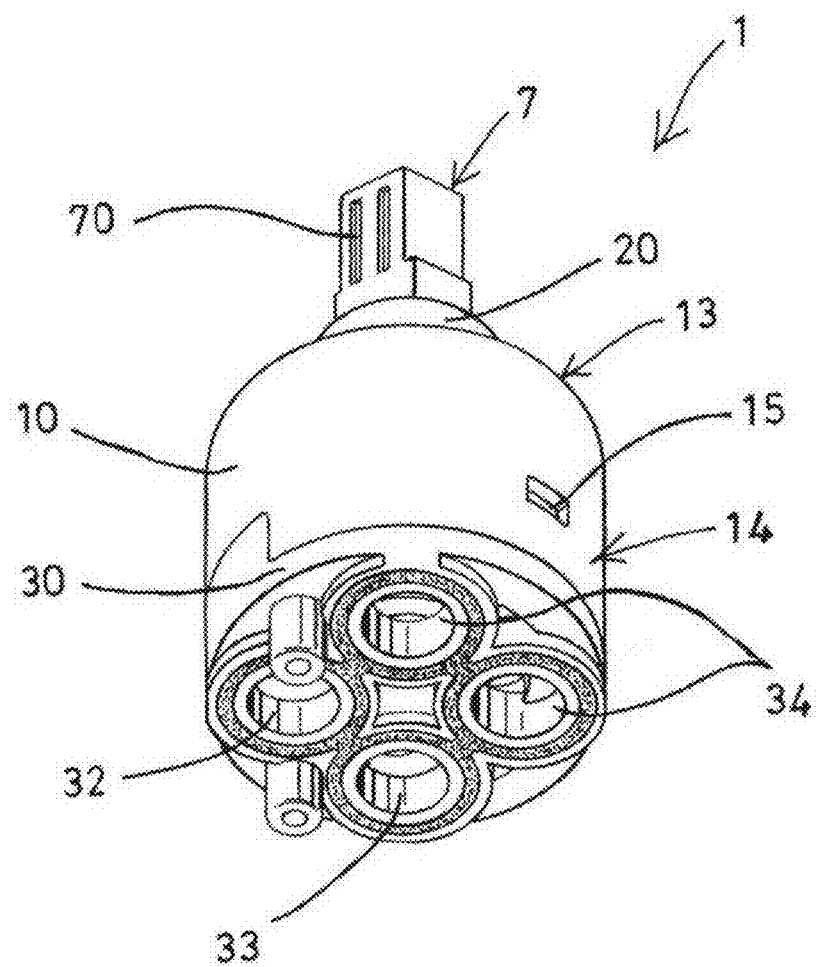
FIG. 1 is a bottom perspective view of a mixing valve device in accordance with the present invention.

Referring to the drawings, and initially to FIGS. 1-5, a mixing valve device 1 in accordance with the present invention comprises an outer housing 10 including a chamber 11 formed therein, and including a narrowed neck portion or opening 12 formed in the upper portion 13 thereof and having a narrowed or reduced inner diameter as compared with the chamber 11 of the outer housing 10, and including an opened lower or bottom portion 14, and including one or more (such as two) lock notches 15 formed therein. The housing 10 is designed and provided for being engaged into an outer faucet body (not shown) of a faucet device, which has been disclosed in U.S. Pat. No. 7,014,166 to Wang, and U.S. Pat. No. 7,389,793 to Wang that may be taken as references for the present invention.

A tubular member or barrel 20 is pivotally or rotatably received or engaged in the neck portion or opening 12 of the outer housing 10 and includes a bore 21 formed therein, and includes a peripheral flange 22 extended radially and outwardly therefrom for engaging with the housing 10 and for anchoring or positioning or retaining the barrel 20 to the housing 10 and for allowing the barrel 20 to be suitably pivoted or rotated relative to the housing 10 (FIGS. 5, 7), and for preventing the barrel 20 from moving axially relative to the housing 10 and for preventing the barrel 20 from being disengaged from the housing 10.

A cap or base or cover 30 is attached or mounted or secured to the lower or bottom portion 14 of the housing 10 and includes one or more (such as two) latches or catches 31 extended therefrom for engaging with the lock notches 15 of the housing 10 and for anchoring or positioning or retaining or securing the cover 30 to the lower or bottom portion 14 of the housing 10 and for suitably blocking or enclosing the lower or bottom portion 14 of the housing 10, and includes two outlet ports 32, 33 and two inlet ports 34 separated from each other and includes one or more (such as four) pegs 35 extended upwardly therefrom, and extended upwardly into the chamber 11 of the outer housing 10, in which the inlet ports 34 are coupled to the cold water and hot water reservoirs (not shown) respectively for receiving the cold water and the hot water from the reservoirs respectively.

A stationary valve piece 40 is disposed in the chamber 11 of the outer housing 10 and contacted or engaged with the cover 30, and includes one or more (such as four) cavities 41 formed therein for engaging with the pegs 35 of the cover 30 and for anchoring or positioning or attaching or retaining the stationary valve piece 40 to the cover 30 and the housing 10, and for preventing the stationary valve piece 40 from being pivoted or rotated relative to the cover 30 and the housing 10, and includes two outlet passages 42, 43 formed therein and aligned with or intersecting or communicating with the outlet ports 32, 33 of the cover 30, and includes two inlet passages 44 formed therein and aligned with or communicating with the inlet ports 34 of the cover 30 for receiving the cold water and the hot water from the inlet ports 34 of the cover 30 respectively.

A gasket or sealing ring or sealing member 80 is disposed between the stationary valve piece 40 and the cover 30 for making a water tight seal between the stationary valve piece 40 and the cover 30 and for suitably guiding the cold water and the hot water to flow from the inlet ports 34 of the cover 30 to and through the inlet passages 44 of the stationary valve piece 40 respectively, and for suitably guiding the mixed water to flow from the outlet passages 42, 43 of the stationary valve piece 40 to and through the outlet ports 32, 33 of the cover 30. A movable valve piece 50 is movably and rotatably received or engaged in the chamber 11 of the outer housing 10 and contacted or engaged with the stationary valve piece 40, in which the valve pieces 40, 50 are preferably made of china or porcelain materials or the like.

The movable valve piece 50 includes an inlet pathway 51 and an outlet pathway 52 formed therein, in which the inlet pathway 51 of the movable valve piece 50 is aligned with or intersecting or communicating with the inlet passages 44 of the stationary valve piece 40 respectively (FIGS. 5-8), and the movable valve piece 50 is rotatable relative to the stationary valve piece 40 for adjusting the communication area or size or dimension of the inlet pathway 51 of the movable valve piece 50 with the inlet passages 44 of the stationary valve piece 40 respectively and thus for adjusting the flowing volume or quantity of the cold water and the hot water through the inlet passages 44 of the stationary valve piece 40 respectively and thus for adjusting the water temperature of the mixed water.

As also shown in FIGS. 5-8, the movable valve piece 50 is also slidable or movable relative to the stationary valve piece 40 for selectively aligning the outlet pathway 52 of the movable valve piece 50 with either of the outlet passages 42, 43 of the stationary valve piece 40, and thus for controlling the mixed water to flow out through either the outlet passage 42 (FIGS. 5, 6) or the other outlet passage 43 (FIGS. 7, 8) of the stationary valve piece 40. The movable valve piece 50 further includes a mixing compartment 53 formed therein and communicating with the inlet pathway 51 and the outlet pathway 52 of the movable valve piece 50 for allowing the cold water and the hot water from the inlet passages 44 of the stationary valve piece 40 to flow through the inlet pathway 51 and into the mixing compartment 53 of the movable valve piece 50, and then to flow out through the outlet pathway 52 of the movable valve piece 50.

Figure 7:
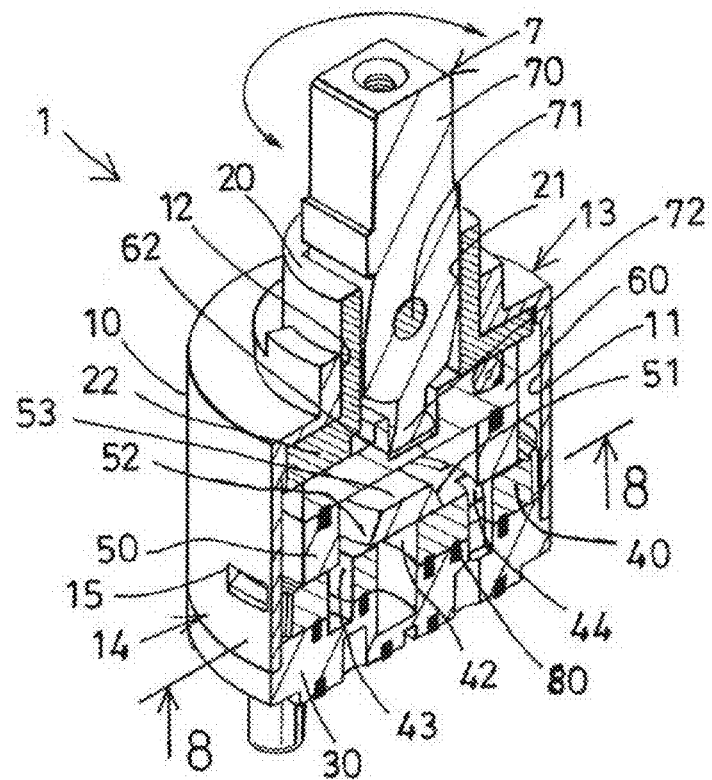
FIG. 7 is another upper perspective view similar to FIG. 5, in which a portion or one half of the mixing valve device has also been cut off for showing the inner structure of the mixing valve device and illustrating the operation of the mixing valve device.

The movable valve piece 50 further includes one or more (such as three) depressions 54 formed therein, such as formed in the outer peripheral portion thereof, and a follower member 60 may further be provided and engaged with or coupled or connected to the movable valve piece 50 for being moved or rotated together with or in concert with the movable valve piece 50. For example, the follower member 60 includes one or more (such as three or three pairs of) projections or keys 61 extended therefrom for engaging with the depressions 54 of the movable valve piece 50 and for anchoring or coupling or securing the follower member 60 to the movable valve piece 50 and thus for allowing the follower member 60 and the movable valve piece 50 to be moved and rotated in concert with each other. The follower member 60 includes a recess 62 formed in the upper portion thereof (FIGS. 5, 7).

A switch bar or actuating lever 70 is engaged into the bore 21 of the barrel 20 and pivotally or rotatably coupled to the barrel 20 with a pivot axle 71 for allowing the lever 70 to be pivoted or rotated relative to the barrel 20 and the housing 10 with the pivot axle 71, and the barrel 20 and the lever 70 are pivotally or rotatably coupled or secured together for allowing the barrel 20 and the lever 70 to be pivoted or rotated relative to the housing 10 with the lever 70, and the lever 70 includes an actuator or actuating end 72 engaged into the recess 62 of the follower member 60 for moving and driving or rotating the follower member 60 and the movable valve piece 50 relative to the stationary valve piece 40. The recess 62 of the follower member 60 includes a non-circular cross section for engaging with the actuating end 72 of the lever 70 that has corresponding non-circular cross section for allowing the follower member 60 and the movable valve piece 50 to be pivoted or rotated relative to the stationary valve piece 40 with the lever 70. The lever 70 and the follower member 60 may be formed and act as an actuating device 7 for attaching or mounting or securing or coupling to the movable valve piece 50 and for actuating or moving and rotating the movable valve piece 50 relative to the stationary valve piece 40.

Figure 5:
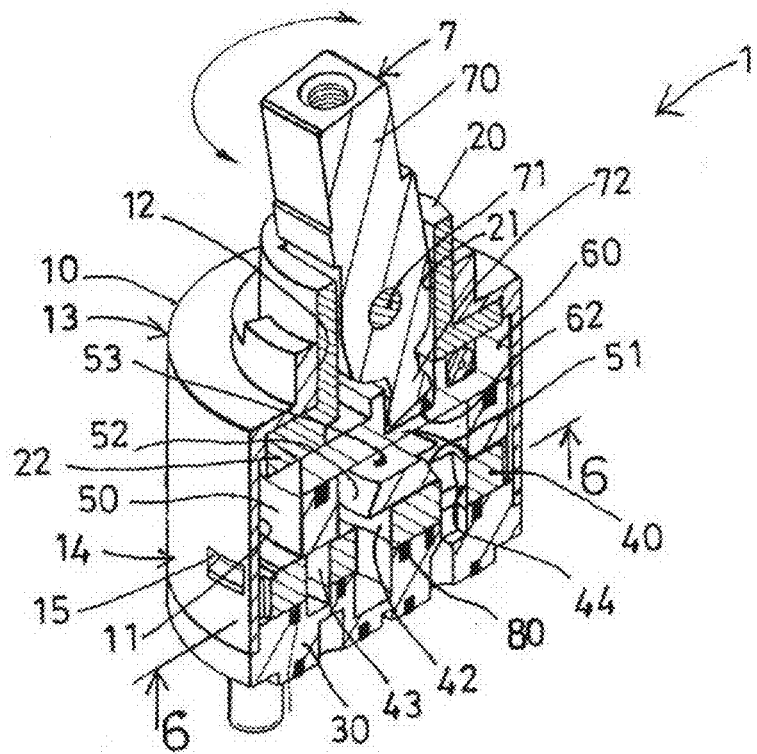
FIG. 5 is an upper perspective view of the mixing valve device, in which a portion or one half of the mixing valve device has been cut off for showing the inner structure of the mixing valve device.
Figure 6:
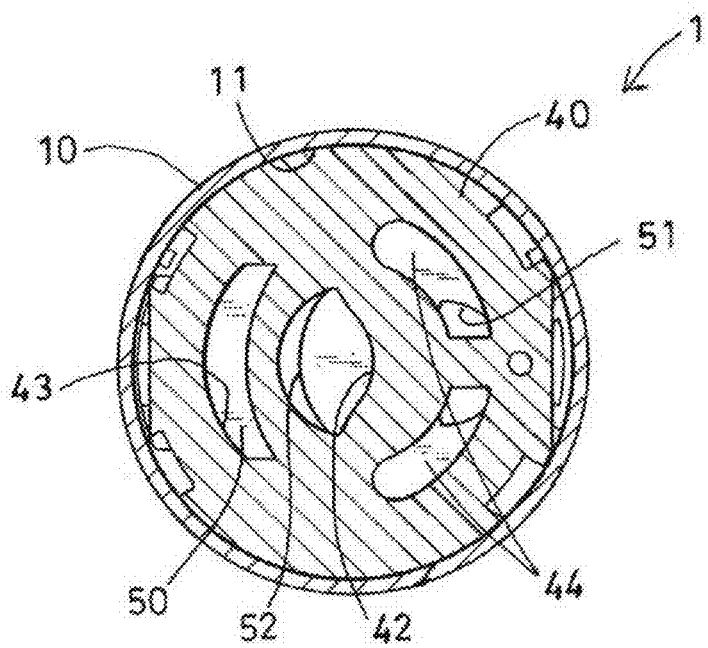
FIG. 6 is a cross sectional view of the mixing valve device taken along lines 6-6 of FIG. 5.

In operation, as shown in FIGS. 5 and 6, the follower member 60 and the movable valve piece 50 may be moved rightward relative to the stationary valve piece 40 with the lever 70, at this moment, the inlet pathway 51 of the movable valve piece 50 is communicating with the inlet passages 44 of the stationary valve piece 40 for allowing the cold water and the hot water from the inlet passages 44 of the stationary valve piece 40 to flow into and through the inlet pathway 51 and then to flow into the mixing compartment 53 of the movable valve piece 50; in addition, the movable valve piece 50 is rotatable relative to the stationary valve piece 40 for adjusting the communication area or size or dimension of the inlet pathway 51 of the movable valve piece 50 with the inlet passages 44 of the stationary valve piece 40 respectively and thus for adjusting the flowing volume or quantity of the cold water and the hot water through the inlet passages 44 of the stationary valve piece 40 respectively and thus for adjusting the water temperature of the mixed water.

As also shown in FIGS. 5 and 6, at this moment, the outlet pathway 52 of the movable valve piece 50 is selectively aligned with one of the outlet passages 42 of the stationary valve piece 40, and thus for controlling the mixed water to flow out through the outlet passage 42 of the stationary valve piece 40, and thus for supplying the mixed water with the selected or predetermined or suitable water temperature out through the outlet passage 42 of the stationary valve piece 40, when the faucet device is used or worked or operated either manually or automatically.

Figure 8:
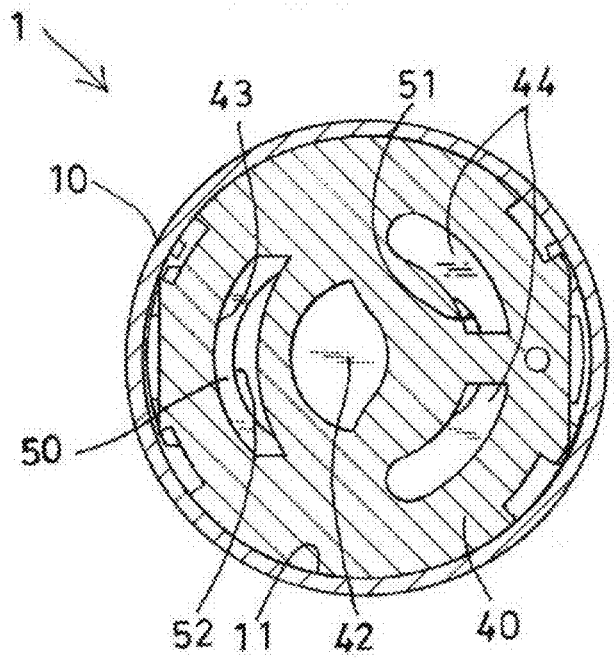
FIG. 8 is a cross sectional view of the mixing valve device taken along lines 8-8 of FIG. 7.

Alternatively, as shown in FIGS. 7 and 8, the follower member 60 and the movable valve piece 50 may also be moved leftward relative to the stationary valve piece 40 with the lever 70, at this moment, the inlet pathway 51 of the movable valve piece 50 is also communicating with the inlet passages 44 of the stationary valve piece 40 for allowing the cold water and the hot water from the inlet passages 44 of the stationary valve piece 40 to flow into and through the inlet pathway 51 and then to flow into the mixing compartment 53 of the movable valve piece 50; and the movable valve piece 50 is also rotatable relative to the stationary valve piece 40 for adjusting the communication area or size or dimension of the inlet pathway 51 of the movable valve piece 50 with the inlet passages 44 of the stationary valve piece 40 respectively and thus for adjusting the flowing volume or quantity of the cold water and the hot water through the inlet passages 44 of the stationary valve piece 40 respectively and thus for adjusting the water temperature of the mixed water.

As also shown in FIGS. 7 and 8, at this moment, the outlet pathway 52 of the movable valve piece 50 is selectively aligned with the other outlet passage 43 of the stationary valve piece 40, and thus for controlling the mixed water to flow out through the other outlet passage 43 of the stationary valve piece 40, and thus for supplying the mixed water with the selected or predetermined or suitable water temperature out through the other outlet passage 43 of the stationary valve piece 40, when the faucet device is used or worked or operated either automatically or manually. When the faucet device is used or worked or operated automatically, a solenoid valve or control device is required to be provided for operating the faucet device, and the faucet device may still be used or worked or operated manually when the solenoid valve or control device has become failed and when the solenoid valve or control device is removed for repairing purposes.

Figure 4:
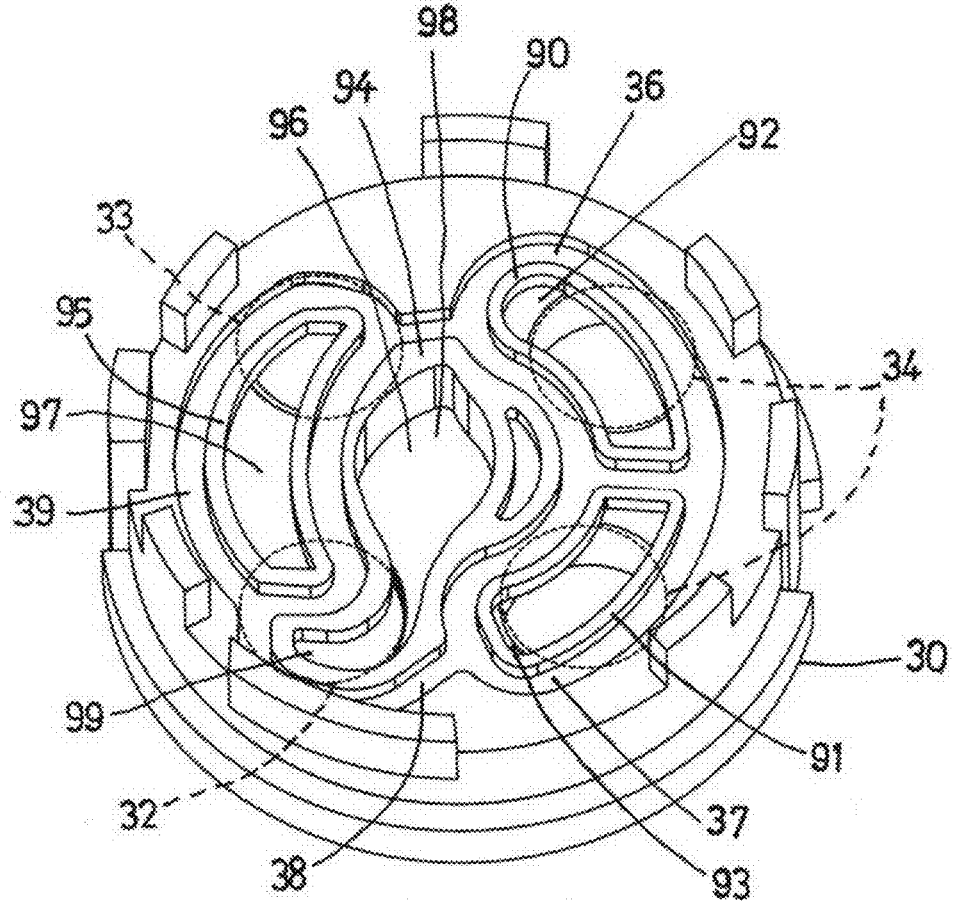
FIG. 4 is an upper perspective view illustrating a sealing member of the mixing valve device.

As shown in FIGS. 4, 5 and 7, the cover 30 includes a recess or depression or cavity or conduit member 36 formed therein, such as formed in the upper portion thereof and formed or defined by four peripheral conduit segments 37, 38, 39 that are intersecting or communicating with each other, and the peripheral conduit segments 37, 38, 39 of the conduit member 36 include a shape similar or identical to that of the sealing member 80 (FIG. 2) for snugly receiving or engaging with the sealing member 80 (FIGS. 5 and 7), and the cover 30 further includes two peripheral bulges or swellings or ribs 90, 91 similar to that of the peripheral conduit segments 37 of the conduit member 36 for forming or defining the peripheral conduit segments 37 and for forming or defining two orifices 92, 93 in the cover 30 that are aligned with or communicating with the inlet ports 34 of the cover 30 for receiving the cold water and the hot water from the inlet ports 34 of the cover 30 respectively, and the orifices 92, 93 in the cover 30 are also aligned with or communicating with the inlet passages 44 of the stationary valve piece 40 for supplying the cold water and the hot water to the inlet passages 44 of the stationary valve piece 40 respectively.

Figure 9:
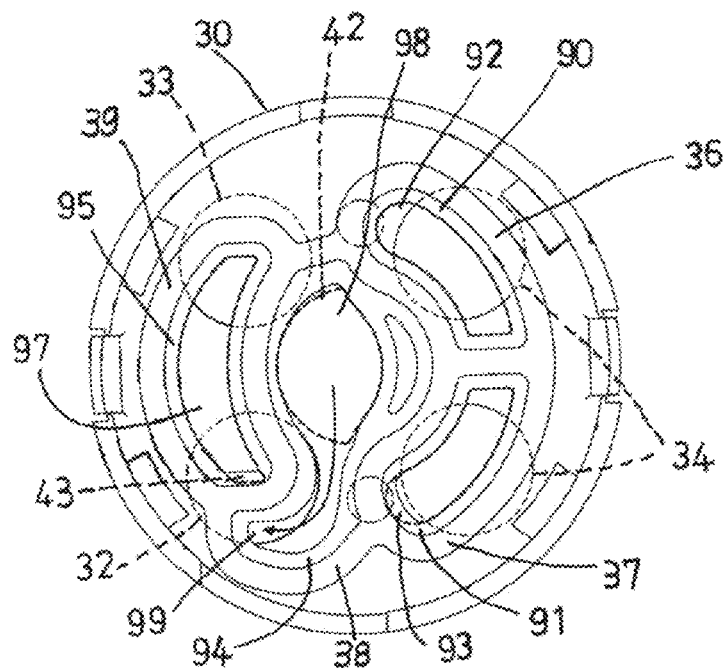
FIG. 9 is a top plan schematic view of the cover of the mixing valve device.

The cover 30 further includes two further peripheral bulges or swellings or ribs 94, 95 similar to that of the peripheral conduit segments 38, 39 of the conduit member 36 for forming or defining the peripheral conduit segments 38, 39 and for forming or defining a space 96 and an aperture 97 in the cover 30 that are aligned with or communicating with the outlet ports 32, 33 of the cover 30 respectively and for guiding the mixed water to flow from the outlet passages 42, 43 of the stationary valve piece 40 to and through the outlet ports 32, 33 of the cover 30; in which the space 96 formed or defined by the peripheral rib 94 includes an oblong shape or structure or configuration having a central or middle or primary space portion 98 offset or spaced from the outlet ports 32, 33 of the cover 30, and a narrowed or curved or relatively reduced neck portion 99 aligned with or intersecting or communicating with the outlet port 32 of the cover 30 for guiding the mixed water to flow from the outlet passage 42 of the stationary valve piece 40 to and through the outlet port 32 of the cover 30 (FIG. 9).

Figure 10:
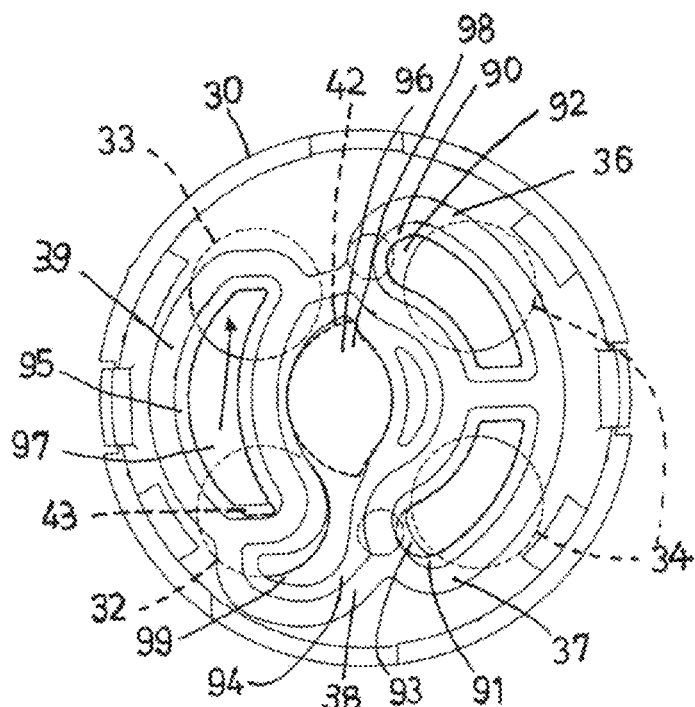
FIG. 10 is another top plan schematic view similar to FIG. 9 illustrating the operation of the cover of the mixing valve device.

The aperture 97 in the cover 30 and formed or defined by the peripheral rib 95 includes an oblong shape or structure or configuration aligned with or intersecting or communicating with the outlet port 33 of the cover 30 for guiding the mixed water to flow from the outlet passage 43 of the stationary valve piece 40 to and through the outlet port 33 of the cover 30 (FIG. 10). It is to be noted that the provision or formation and the communicating of the narrowed or curved or relatively reduced neck portion 99 of the space 96 of the peripheral rib 94 with the outlet port 32 of the cover 30 allows the outlet ports 32, 33 of the cover 30 to be arranged side by side and allows the outlet ports 32, 33 and the inlet ports 34 of the cover 30 to be arranged in a square shape or structure or configuration (FIGS. 1, 2) and for allowing the size or dimension or volume or space or area of the cover 30 to be suitably reduced or decreased.

Accordingly, the mixing valve device in accordance with the present invention includes a switchable structure for switching to different outlet ports and for selectively operatable either manually or automatically and for allowing the mixing valve device to be used or worked manually even when the solenoid valve or control device has become failed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mixing valve device comprising:
a housing including a chamber formed therein, and including an opening formed in an upper portion thereof and including a bottom portion,
a cover attached to said bottom portion of said housing and including two inlet ports separated from each other for receiving cold water and hot water respectively, and including a first outlet port and a second outlet port formed therein, said cover including a conduit member formed therein and defined by two first peripheral conduit segments and a second peripheral conduit segment and a third peripheral conduit segment,
a stationary valve piece disposed in said chamber of said housing and attached to said cover, and including two inlet passages formed therein and communicating with said inlet ports of said cover for receiving the cold water and the hot water from said inlet ports of said cover respectively, and including a first outlet passage and a second outlet passage formed therein and communicating with said first and said second outlet ports of said cover respectively,
a sealing member engaged with said conduit member of said cover and engaged with said stationary valve piece for making a water tight seal between said stationary valve piece and said cover,
said cover including two first peripheral ribs for forming said first peripheral conduit segments and for forming two orifices in said cover which are communicating with said inlet ports of said cover for guiding the cold water and the hot water from said inlet ports of said cover to said inlet passages of said stationary valve piece respectively, said cover including a second peripheral rib and a third peripheral rib for forming said second and said third peripheral conduit segments and for forming a space and an aperture in said cover which are communicating with said first and said second outlet ports of said cover respectively and for guiding the mixed water to flow from said first and said second outlet passages of said stationary valve piece to said first and said second outlet ports of said cover respectively, said space defined by said second peripheral rib including an oblong structure having a primary space portion offset and spaced from said first and said second outlet ports of said cover and a narrowed and curved neck portion communicating with said first outlet port of said cover for guiding the mixed water to flow from said first outlet passage of said stationary valve piece to said first outlet port of said cover, and said aperture in said cover and formed by said second peripheral rib including an oblong structure communicating with said second outlet port of said cover for guiding the mixed water to flow from said second outlet passage of said stationary valve piece to said second outlet port of said cover,
a movable valve piece movably and rotatably received and engaged in said chamber of said housing and engaged with said stationary valve piece, and including an outlet pathway formed therein, and said movable valve piece being movable relative to said stationary valve piece for selectively aligning said outlet pathway of said movable valve piece with either said first outlet passage or said second outlet passage of said stationary valve piece and for controlling the mixed water to flow out through either said first or said second outlet passage of said stationary valve piece, said movable valve piece including an inlet pathway formed therein and communicating with said inlet passages of said stationary valve piece, and said movable valve piece being rotatable relative to said stationary valve piece for adjusting a communication area of said inlet pathway of said movable valve piece with said inlet passages of said stationary valve piece and for adjusting a flowing quantity of the cold water and the hot water through said inlet passages of said stationary valve piece and for adjusting a water temperature of a mixed water when said outlet pathway of said movable valve piece is communicating with either said first outlet passage or said second outlet passage of said stationary valve piece, and an actuating device coupled to said movable valve piece for moving and rotating said movable valve piece relative to said stationary valve piece to selectively aligning said outlet pathway of said movable valve piece with either said first outlet passage or said second outlet passage of said stationary valve piece and to selectively rotating said movable valve piece relative to said stationary valve piece and to adjust the communication area of said inlet pathway of said movable valve piece with said inlet passages of said stationary valve piece and to adjust the flowing quantity of the cold water and the hot water through said inlet passages of said stationary valve piece and to adjust the water temperature of the mixed water.

2. The mixing valve device as claimed in claim 1, wherein said actuating device includes a follower member connected to said movable valve piece for being moved and rotated in concert with said movable valve piece.

3. The mixing valve device as claimed in claim 2, wherein said movable valve piece includes at least one depression formed therein, and said follower member includes at least one key extended therefrom for engaging with said at least one depression of said movable valve piece and for anchoring said follower member to said movable valve piece and for allowing said follower member and said movable valve piece to be moved and rotated in concert with each other.

4. The mixing valve device as claimed in claim 2, wherein said actuating device includes an actuating lever connected to said follower member for moving and rotating said movable valve piece relative to said stationary valve piece.

5. The mixing valve device as claimed in claim 4, wherein said actuating device includes a barrel rotatably received and engaged in said opening of said housing and having a bore formed in said barrel, and said actuating lever is engaged into said bore of said barrel and pivotally coupled to said barrel with a pivot axle, and said actuating lever includes an actuating end engaged with said follower member for moving and rotating said follower member and said movable valve piece relative to said stationary valve piece.

6. The mixing valve device as claimed in claim 5, wherein said follower member includes a non-circular recess formed therein, and said actuating end of said actuating lever includes a non-circular cross section for engaging with said non-circular recess of said follower member.

\* \* \* \* \*